Jan. 24, 1961  M. I. S. LEITHE  2,969,195
COIL WINDING APPARATUS
Filed March 14, 1957  2 Sheets-Sheet 1
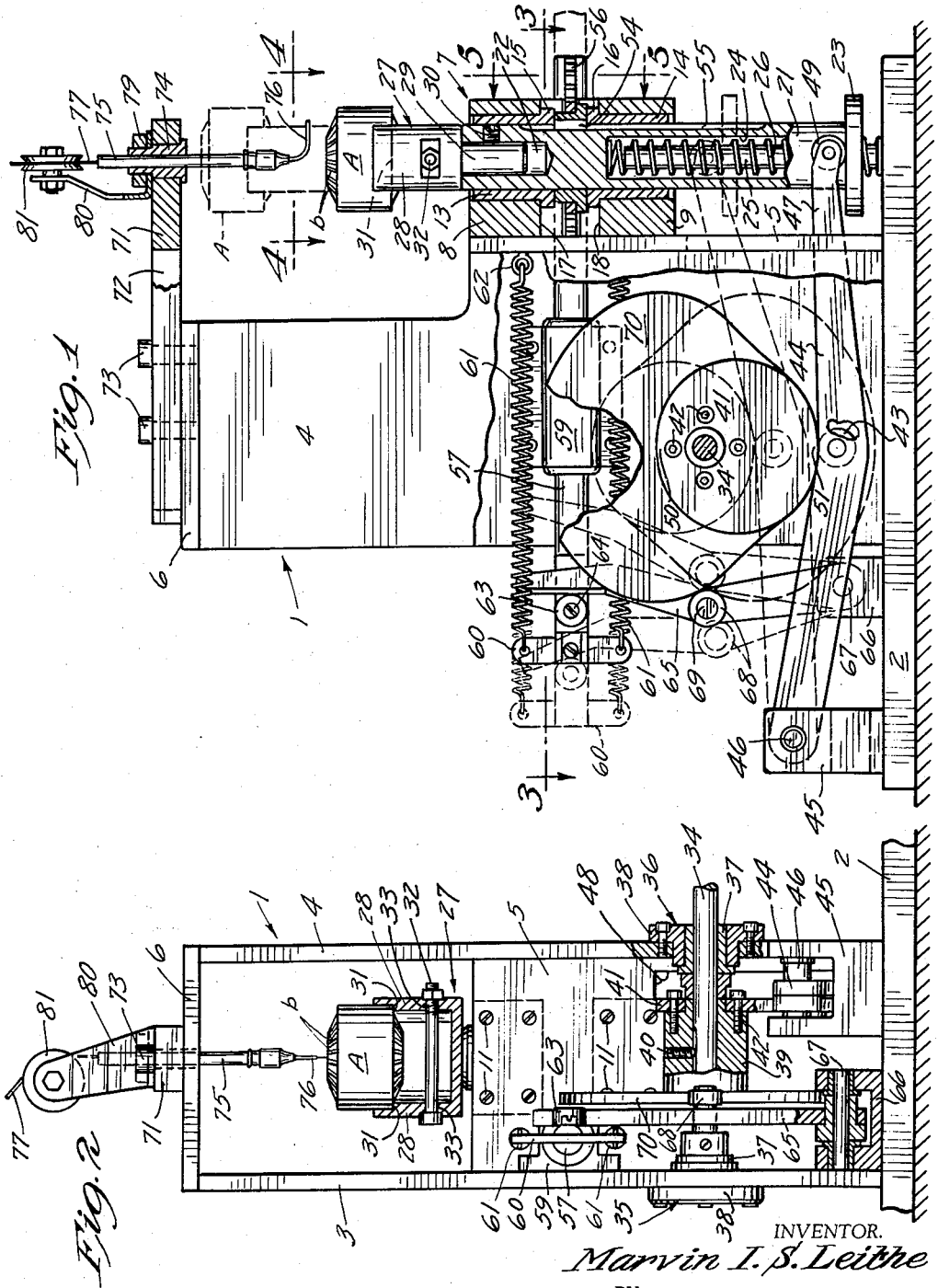
INVENTOR.
Marvin I. S. Leithe
BY
Merchant & Merchant
ATTORNEYS Jan. 24, 1961
M. I. S. LEITHE
2,969,195
COIL WINDING APPARATUS
Filed March 14, 1957
2 Sheets-Sheet 2
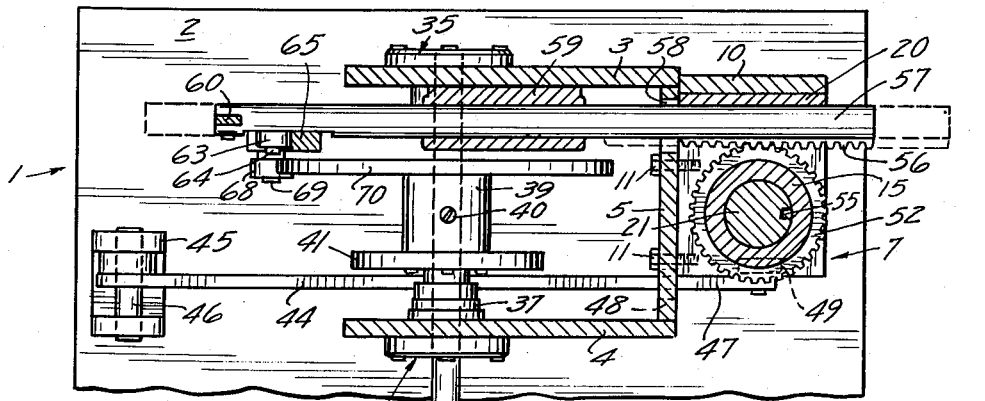
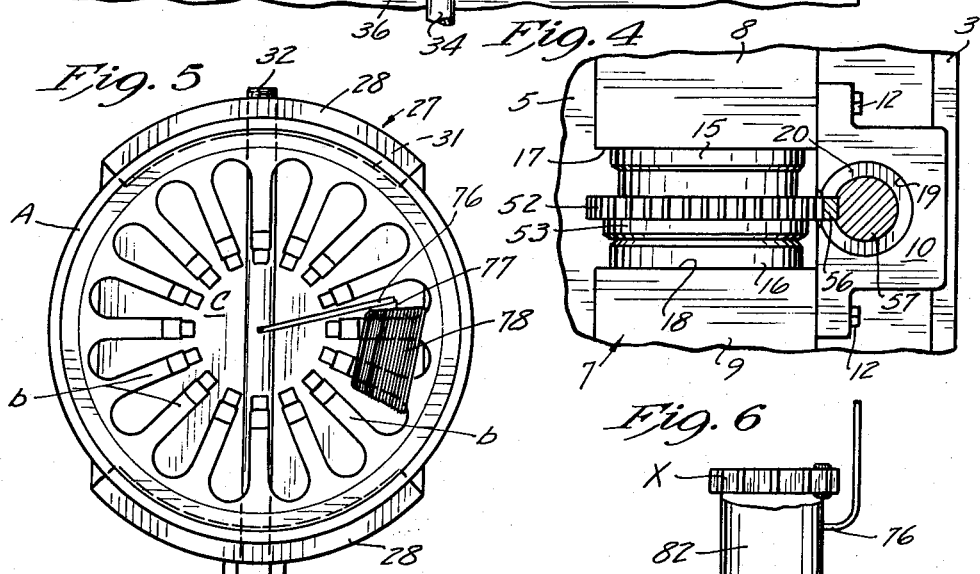
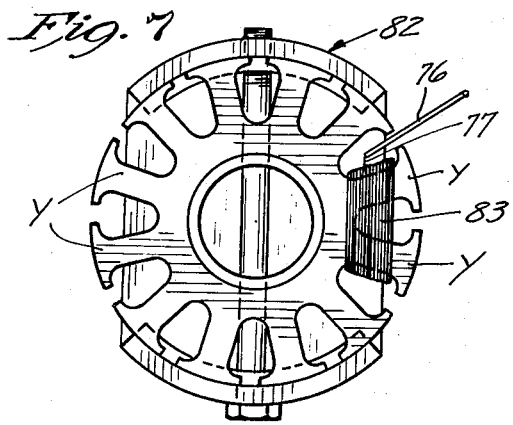
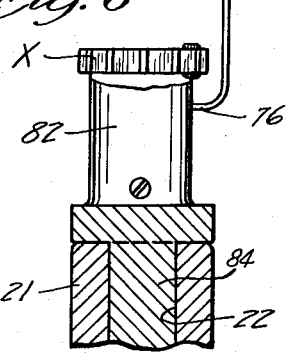
INVENTOR.
Marvin I. S. Leithe
BY
Merchant & Merchant
ATTORNEYS United States Patent Office 2,969,195
Patented Jan. 24, 1961

2,969,195

COIL WINDING APPARATUS

Marvin I. S. Leithe, Minneapolis, Minn., assignor to Cedar Engineering, Inc., St. Louis Park, Minn., a corporation of Minnesota Filed Mar. 14, 1957, Ser. No. 645,982

3 Claims. (Cl. 242—1.1)

My invention relates generally to coil winding apparatus, and more particularly to devices for winding coils of wire on magnetic cores of electrical motor components.

Heretofore, in providing magnetic cores of electrical motors, particularly cores for field or stator elements of said motors, with wire coils, the coils have been first wound on blocks or forms, and thereafter removed from such forms and placed on the pole pieces of the cores. In some machines heretofore developed, shuttle devices have been used to coil wire directly on the pole pieces of the magnetic core to be wound. In either case, machines thus utilized have been complicated in structure and costly to produce. An important object of my invention is, therefore, the provision of a simple and inexpensive coil winding device which eliminates the necessity for blocks or forms on which the wire must be wound prior to mounting the same on the pole pieces, or a shuttle element and involved mechanism for operating the same.

Another object of my invention is the provision of coil winding apparatus which is quickly and easily adjusted for use in winding coils on cores of various diameters, and which can be as quickly and easily adjusted for use in winding coils on armature core elements having radially outwardly projecting pole pieces, as well as on field or stator core elements having radially inwardly projecting pole pieces.

A further object of my invention is the provision of a coil winding device utilizing a relatively stationary wire feeding tube, relatively movable core holding mechanism, and novel means for imparting reciprocatory and oscillatory movements to the core holding mechanism so that the same moves in directions and in a path relative to the feed tube to cause wire to be automatically wound about the desired pole pieces.

A still further object of my invention is the provision of novel means for mounting a wire feeding tube relative to the core element to be wound, whereby the feeding tube may be easily and accurately positioned with respect to cores of either armature or field elements of a motor, and for such elements of various sizes.

Another object of my invention is the provision of a coil winding device as set forth having a chuck for holding core elements, and of releasable means for mounting the chuck, whereby the same may be quickly and easily removed for replacement by a chuck for mounting different sized core elements.

Still another object of my invention is the provision of coil winding apparatus as set forth which is highly efficient in operation, rugged in construction, and durable in use.

The above, and still further highly important objects and advantages of my invention will become apparent from the following detailed specification, appended claims and attached drawings.

Referring to the drawings, which illustrate the invention, and in which like reference characters indicate like parts throughout the several views—

Fig. 1 is a view in side elevation of a coil winding machine built in accordance with my invention, some parts being broken away and some parts being shown in section;

Fig. 2 is a view in end elevation as seen from the left to the right with respect to Fig. 1, some parts being broken away and some parts being shown in section;

Fig. 3 is a horizontal section taken substantially on the line 3—3 of Fig. 1, some parts being broken away;

Fig. 4 is an enlarged fragmentary detail partly in plan and partly in horizontal section, taken on the line 4—4 of Fig. 1;

Fig. 5 is an enlarged fragmentary detail partly in front elevation and partly in section, taken substantially on the line 5—5 of Fig. 1;

Fig. 6 is an enlarged fragmentary view partly in side elevation and partly in section, of a modified form of the work-holding chuck of my invention, and showing a modified arrangement of the wire feeding tube of my invention; and Fig. 7 is an enlarged view in top plan of the modification illustrated in Fig. 6.

In the preferred embodiment of the invention illustrated in Figs. 1–5 inclusive, the numeral 1 indicates in its entirety a frame comprising, a base plate 2, plate-like side frame members 3 and 4, a front wall element 5 connecting the side frame members 3 and 4, and a plate-like top cross member 6 connecting the upper ends of the side frame members 3 and 4.

A bearing 7 comprises a pair of vertically spaced bearing blocks 8 and 9 and a connecting bracket 10, said bearing blocks 8 and 9 being rigidly secured, by screws or the like 11 to the front wall element 5 of the frame 1, the bracket element 10 being secured to the bearing blocks 8 and 9 by suitable means such as screws or the like 12. The bearing blocks 8 and 9 are bored to receive axially aligned upper and lower bearing sleeves 13 and 14 respectively, said sleeves having diametrically enlarged heads 15 and 16 respectively that engage the bottom and top surfaces 17 and 18 respectively of their respective bearing blocks 8 and 9. The bearing bracket 10 is provided with a transverse aperture 19 in which is mounted a split bearing sleeve 20 the purpose of which will hereinafter become apparent.

Mounted for rotary and axial sliding movements in the bearing sleeves 13 and 14 is an elongated vertically disposed rock shaft 21 having an upwardly opening axial recess 22 in its upper end and a diametrically enlarged head or flange 23 at its lower end. The rock shaft 21 is further provided with a relatively deep downwardly opening axial recess 24 in which is received a vertically disposed stem 25 which is rigidly connected at its lower end to the base plate 2. The stem 25 provides support for an elongated coil compression spring 26 which loosely encompasses the stem 25 and which is interposed between the base plate 2 and the inner end of the recess 24 to yieldingly urge the rock shaft 21 in an upward direction of its axial movement. A work holding chuck 27 includes a pair of opposed jaws 28 and an axially extended mounting stem 29 that is slidably received in the recess 22 of the rock shaft 21, and which is adapted to be releasably locked for common movements with the rock shaft 21 by means of a set screw or the like 30, see Fig. 1. The opposed jaws 28 are formed to provide internal shoulders 31 that are adapted to support a work piece such as a magnetic field core or stator element A. The core element A is of the type having a plurality of axially extending radially inwardly projecting pole pieces $b$ in circumferentially spaced relationship, the inner ends of the pole pieces defining a central opening $c$ adapted to receive a cooperating armature, not shown, when the core A is wound and included in a motor assembly, not shown. A nut equipped clamping bolt 32 extends transversely through aligned openings 33 in the jaws 28, and is operative to releasably clamp the work piece or core element A between the jaws 28. The arrangement is such that the core element A, when mounted in the chuck 27, is axially aligned with the rock shaft 21, for a purpose which will hereinafter become apparent.

Means for imparting axial reciprocatory movement to the rock shaft 21 comprises the coil compression spring 26 and mechanism now to be described. A horizontally disposed drive shaft 34 extends transversely of the side frame members 3 and 4, and is journalled in bearings 35 and 36 each comprising bearing sleeves 37 and mounting flanges 38 suitably anchored to their respective side frame members 3 and 4. As partially shown in Fig. 2, the side frame members 3 and 4 are bored to receive the bearings 35 and 36 respectively and the drive shaft 34. The shaft 34 may be assumed to be operatively coupled to a suitable source of power, such as a drive motor, not shown. A hub 39 is mounted on the drive shaft 34 intermediate the side frame members 3 and 4 and is locked to the drive shaft 34 for common rotation therewith by a set screw or the like 40. A cam element 41 is mounted on one end of the hub 39 by means of anchoring screws or the like 42, and has operative engagement with a cam follower roller 43 that is journalled in the intermediate portion of a lever 44 which is pivotally secured on a horizontal axis to a mounting bracket 45, as indicated at 46. The mounting bracket 45 is suitably anchored to the base plate 2 adjacent its rear end, see Figures 1 and 3. The front end portion 47 of the lever 44 extends forwardly through an elongated opening 48 in the front wall element 5 of the frame 1, and is provided at said front end 47 with a roller 49 that engages the flange or head 23 of the rock shaft 21, whereby to impart downward reciprocatory movement to the rock shaft 21 against yielding bias of the spring 26 upon rotation of the drive shaft 34 and the cam 41. Obviously, the spring 26 causes the rock shaft 21 to move in an upward direction of its reciprocatory movement during part of the rotation of the drive shaft 34 and cam 41, and maintains the cam follower roller 43 in operative engagement with the cam 41.

The top and bottom portions of the cam 41, as seen in Fig. 1 and indicated at 50 and 51 respectively, constitute relatively short dwell portions which cause the rock shaft 21 to remain stationary at its upper and lower limits of reciprocatory movement for very brief periods of time, during which periods limited rotary or oscillatory movements are imparted to the rock shaft 21 by mechanism now to be described. A toothed gear 52, as shown in Figure 4, provided with a hub portion 53 is mounted on the rock shaft 21, by means of a key 54, and between the flanges 15 and 16 of the bearing sleeves 13 and 14 respectively, for common oscillatory movements with the rock shaft 21 and for axial sliding movements with respect thereto. As shown in Fig. 1, the key 54 is slidably contained in an axially extending keyway 55 in the rock shaft 21. A gear rack 56 has meshing engagement with the toothed gear 52 and is carried by a reciprocating rod 57 longitudinally slidably mounted in the split bearing sleeve 20, the rack 56 projecting radially through the split portion of the bearing sleeve 20.

The rod 57 extends rearwardly through an opening 58 in the first wall element 5 and is slidably supported intermediate its ends by a bearing element 59 rigidly secured to the side frame member 3. At its rear end, the rod 57 is notched to receive a vertically disposed cross piece 60 to the opposite ends of which are connected the rear ends of a pair of vertically spaced coil tension springs 61, the front ends of said springs being connected to the front wall element 5 by anchoring screws or the like 62, one of which is shown. The tension springs 61 yieldingly urge the rod 57 in a direction to impart limited rotary movement in one direction to the rock shaft 21. A roller 63 is journalled on a mounting screw or the like 64 that projects laterally outwardly from the rod 57 adjacent the rear end thereof, said roller engaging the outer end of a lever 65 that is journalled to and extends generally upwardly from a mounting bracket 66, as indicated at 67. The mounting bracket 66 is suitably anchored to the base plate 2 adjacent the rear end portion of the side frame member 3. A cam follower roller 68 is journalled on a stub shaft 69 which projects laterally outwardly from the intermediate portion of the lever 65, said roller 68 being yieldingly biased by the springs 61 through the connection thereof to the reciprocatory rod 57 and engagement of the roller 63 with the upper end portion of the lever 65, into engagement with the marginal surface of a second cam 70 which is mounted on the hub 39 at an end thereof opposite to that on which the cam 41 is mounted. The shape of the cam 70 is such that, when the rock shaft 21 is at its lower limit of reciprocatory movement, the rod 57 will be caused to move by the cam 70 in one direction of its reciprocatory movement to impart oscillating rotary movement to the rock shaft in one direction; and when the rock shaft 21 is at its upper limit of reciprocatory movement, the rod 57 will be caused to move in the opposite direction to impart oscillating rotary movement to the rock shaft 21 in the opposite direction. The cam 70 is so shaped that periods of dwell occur in the oscillating movement of the rock shaft 21 during axial reciprocating thereof.

An elongated mounting bar 71 is provided with a longitudinally extending vertical slot 72 and has its rear end portion resting on the top frame member 6, said mounting bar 71 being rigidly but adjustably mounted on the top plate 6 by means of a pair of spaced clamping screws 73 which extend downwardly through the slot 72 and which are screw threaded into the top plate 6, the heads of the screws 73 engaging the top surface of the bar 71 on opposite sides of the slot 72. The front end portion of the mounting bar 71 is bored to receive a vertically extended bushing 74 which snugly slidably receives a vertically extended guide tube 75 having a diametrically reduced lower discharge end portion 76 which is curved to extend angularly outwardly or radially outwardly from the axis of the guide tube 75. The tube 75 is of a diameter sufficiently small to pass freely through the axial opening $c$ in the core element A, the discharge end portion 76 having an external diameter sufficiently small to enable the same to pass freely between the inner end portions of the radially inwardly projecting pole pieces $b$ of the core element A, the inner diameter of the discharge end portion 76 being sufficiently great to permit free passage therethrough of electrical conductor wire 77 which is utilized to form coils 78 wound on selected pole pieces $b$ or groups thereof. The upper end of the bushing 74 is threaded to receive a clamping nut 79 which not only anchors the bushing 74 in place, but also secures a mounting bracket 80 to the front end portion of the mounting bar 71. A guide pulley 81 is suitably journalled to the upper end of the bracket 80 and guides the wire 77 to the upper inlet end of the guide tube 75, from a suitable source of supply, not shown.

In operation, the mounting bar 71 is positioned relative to the frame 1 so that the guide tube 75 is adapted to pass downwardly through the central opening $c$ in the core element A clamped in the chuck 27, with the discharge end portion 76 of the guide tube 75 being aligned with the opening between a selected pair of the pole pieces b of the core element. This is done when the rock shaft 21 is positioned intermediate its limits of reciprocatory movement wherein the discharge portion 76 of the guide tube will be contained between the selected pole pieces b intermediate the ends of the core element A. A length of wire 77 is manually drawn through the discharge end portion 76 of the guide tube to enable an end thereof to be temporarily fastened to the exterior surface of the core element A, after which rotary movement is imparted to the drive shaft 34. With the free end of the wire 77 being thus secured to the core element A, a reciprocatory movement of the rock shaft 21 and the core element A carried thereby will cause wire 77 to be drawn downwardly through the guide tube 75 and outwardly of the discharge end portion 76 thereof until the core element A reaches one end of its reciprocatory movement, whereupon the rock shaft 21 will be caused to rotate in one direction of this oscillatory movement to cause the discharge end portion 76 of the guide tube to be aligned with the space between a different pair of pole pieces b. Continued rotation of the drive shaft 34 then causes the rock shaft 21 and core element A to be moved axially in the opposite direction, such movement causing more wire to be drawn from the guide tube 75. Upon reaching the opposite limit of its reciprocatory movement, the rock shaft 21 is then rotated in the opposite direction of its oscillatory movement to align the discharge end of the guide tube with the original space between the selected pole pieces b. It will be noted that the discharge end portion 76 of the guide tube 75 is disposed in overlying spaced relation to the upper end of the core element A when the rock shaft is at its lower limit of reciprocatory movement, whereas the discharge end portion 76 is disposed in downwardly spaced relation to the core element A when the rock shaft 21 is at its upper limit of reciprocatory movement. The cycle is repeated until the required number of turns of wire are wound about the selected pole pieces b, the wire being drawn from the guide tube 75 in a smooth and uninterrupted manner during the winding of the coil 78. After a given number of turns have been wound as above described, the clamping bolt 32 is loosened, and the core element A is rotated with respect to the chuck 27 to properly position the core element for winding of a subsequent coil about one or more other selected pole pieces b. The process is then repeated until the entire core element has been properly wound, the whole operation being efficiently completed within a minimum of time.

In the modified arrangement illustrated in Figures 6 and 7, a chuck 82, similar to the chuck 27 of Figures 1–5, is shown as supporting a core element x having circumferentially spaced axially extending pole pieces y which project radially outwardly from the central portion of the core element x, this element being commonly utilized as the rotor or commutator portion of an electric motor. In winding a coil 83 of conductor wire 77 about a given one or plurality of the pole pieces y, the mounting bar 71 is adjusted to position the guide tube 75 radially outwardly of the core element x, the discharge end portion 76 extending radially inwardly between adjacent pole pieces y, see Figure 7. With the guide tube 75 thus positioned, winding of the core element x proceeds in the same manner as that described above in connection with the core element A. With reference to Fig. 6, it will be seen that the chuck 82 is provided with a stem 84 which is adapted to be locked in the recess 22 of the rock shaft 21 in the same manner as is the stem 29 of the chuck 27.

The above described machine is easily adapted to winding of different sized core elements by the utilization of different core holding chucks of the type indicated at 27 and 82. Different coil arrangements are achieved by the use of cams similar to the cams 41 and 70 but slightly modified as to shape and size. The changing of cams is relatively simple, it being merely necessary to loosen the set screw 40 in the hub 39 and remove the drive shaft 34 from the bearings 35 and 36. The hub 39 with its cams 41 and 70 may be then removed and a different cam equipped hub substituted therefor; or a different pair of cams may be mounted on the hub 39 and the same placed in the machine, if desired.

My invention has been thoroughly tested and found to be completely satisfactory for the accomplishment of the objectives set forth; and while I have shown a preferred embodiment of my novel coil winding machine, and a modified arrangement, it will be understood that the same is capable of further modification without departure from the spirit and scope of the invention, as defined in the claims.

I claim:

1. In a coil winding machine, a frame, a bearing carried by said frame, a rock shaft mounted in said bearing for axial reciprocatory and oscillatory movements, a chuck on one end of said rock shaft, said chuck being adapted to receive and to grip a generally cylindrical core element in axial alignment with said rock shaft, said core element being of the type having circumferentially spaced axially extending radial pole pieces, means for imparting axial reciprocatory movement to said rock shaft, means including a rack and pinion for imparting oscillatory movements to said rock shaft, said pinion being mounted in said bearing and coupled to said rock shaft for common oscillatory movements therewith and for axial sliding movement relative thereto, a stationary wire guide tube extending generally parallel to the axis of said bearing, said guide tube having a wire discharge end portion extending angularly from said guide tube and generally radially with respect to a core element mounted in said chuck, said discharge end portion being alternately received between different selected circumferentially spaced pole pieces of said core element during said reciprocatory and oscillatory movements of the core element and rock shaft, a member mounting said guide tube on said frame for limited bodily adjustment thereof in directions transversely of the axis of the core element, and means for releasably locking said guide tube mounting member to said frame in desired adjusted positions between the limits of transverse adjustment thereof.

2. In a coil winding machine, a frame, a bearing carried by said frame, a rock shaft mounted in said bearing for axial reciprocatory and oscillatory movements, a chuck releasably anchored to one end portion of said rock shaft for common movements therewith, said chuck being adapted to receive and grip a generally cylindrical core element in axial alignment with said rock shaft, said core element being of the type having circumferentially spaced axially extending radial pole pieces, a resilient member yieldingly urging said rock shaft in one direction of its axial reciprocatory movement, a second resilient member yieldingly urging said rock shaft in one direction of its oscillatory movement, a rotary drive shaft journalled in said frame, a pair of cam elements mounted on said drive shaft for common rotation therewith, a pair of levers pivotally mounted on said frame, each of said levers having a cam follower element in engagement with a different one of said cam elements, one of said levers engaging said rock shaft to impart axial reciprocatory movements thereto in one direction against yielding bias of one of said resilient members, means operatively coupling the other lever of said pair to said rock shaft to impart oscillatory movements thereto in one direction against yielding bias of said second resilient member, and a stationary wire guide tube mounted on said frame and extending generally parallel to the axis of said bearing, said guide tube having a wire discharge end portion extending angularly from said guide tube and generally radially with respect to a core element mounted in said chuck, said discharge end portion being alternately received between different selected circumferentially spaced pole pieces of said core element during said reciprocatory and oscillating movement of said rock shaft.

3. The structure defined in claim 2 in which the means operatively connecting said other lever to said rock shaft comprises, a gear rotatively mounted in said bearing and coupled to said rock shaft for common rotation therewith and for axial sliding movements relative to said rock shaft, and a cooperating gear rack slidably mounted in said frame and having meshing engagement with said gear, said rack being pivotally connected to said other lever to be moved thereby.

References Cited in the file of this patent

UNITED STATES PATENTS

| | | |
|---|---|---|
| 1,407,033 | Huggins | Feb. 21, 1922 |
| 1,692,114 | Darby | Nov. 20, 1928 |
| 1,977,828 | Laib et al. | Oct. 23, 1934 |
| 2,551,521 | Anderson et al. | May 1, 1951 |
| 2,770,424 | Grove | Nov. 13, 1956 |